United States Patent
Herc

(10) Patent No.: US 6,216,811 B1
(45) Date of Patent: *Apr. 17, 2001

(54) ACID RETENTION SYSTEM FOR A VEHICLE BATTERY

(75) Inventor: Matthew J. Herc, Shelby Township, MI (US)

(73) Assignee: DaimlerChrysler Corporation, Auburn Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,308

(22) Filed: Mar. 17, 1999

(51) Int. Cl.[7] ............ B60R 16/04; B62D 25/20; B62D 27/00; H01M 2/10
(52) U.S. Cl. ............ 180/68.5; 180/69.1; 429/100; 296/38
(58) Field of Search ............ 180/68.5, 69.1; 429/99, 100; 296/38; 261/74

(56) References Cited

U.S. PATENT DOCUMENTS

| | | |
|---|---|---|
| D. 262,104 | 12/1981 | Simpson . |
| 1,382,980 | 6/1921 | Hunt . |
| 2,104,767 | 1/1938 | Sauders . |
| 2,196,578 | 4/1940 | Greig . |
| 3,779,330 * | 12/1973 | Longpre ............... 180/68.5 |
| 3,973,549 * | 8/1976 | Drummond ............ 180/69.1 |
| 4,098,366 | 7/1978 | Reinhard et al. . |
| 4,327,809 | 5/1982 | Fenstermaker . |
| 4,577,713 * | 3/1986 | Moon ................... 180/69.1 |
| 4,695,088 * | 9/1987 | Jensen ................... 180/69.1 |
| 4,750,775 * | 6/1988 | Miller ................... 180/69.1 |
| 4,976,327 * | 12/1990 | Abujudom et al. ...... 180/68.5 |
| 5,031,712 | 7/1991 | Karolek et al. . |
| 5,547,036 * | 8/1996 | Gawaskar et al. ...... 180/68.5 |
| 5,620,057 | 4/1997 | Klemen et al. . |
| 5,636,701 | 6/1997 | Norman et al. . |
| 5,681,668 * | 10/1997 | Reed et al. ............ 180/68.5 |
| 5,791,156 * | 8/1998 | Strautman et al. ....... 180/69.1 |

* cited by examiner

Primary Examiner—Lanna Mai
Assistant Examiner—Jeff Restifo
(74) Attorney, Agent, or Firm—Marc Lorelli

(57) ABSTRACT

A battery tray that includes a system for controlling the flow of fluid is provided. The battery tray includes a base surface having a retention cup formed therein. The retention cup collects aqueous sulfuric acid discharged from the battery. The retention cup includes a vent or slot formed therein to allow its contents to evaporate over time. A system of troughs and channels are included in the base surface to direct fluid flow towards the retention cup. The battery tray effectively controls the flow of aqueous sulfuric acid so that the acid does not contact neighboring vehicular components. If aqueous sulfuric acid contacts metal vehicle components it will promote corrosion of the components.

8 Claims, 2 Drawing Sheets

ACID RETENTION SYSTEM FOR A VEHICLE BATTERY

BACKGROUND OF THE INVENTION

1. Technical Field

The present invention relates in general to batteries. More particularly, but without restriction to the particular embodiment and/or use which is shown and described for purposes of illustration, the present invention relates to a acid retention system for a vehicular battery.

2. Discussion

Every motor vehicle includes a battery that is essential to the electrical system of the vehicle. The battery converts electrical current generated by the engine, or more specifically the alternator, into chemical energy that may be stored. The chemical potential energy of the battery can then be harnessed by conversion into the needed electrical current at a later time.

Each battery includes a plurality of positive and negative plates or electrodes immersed in an electrolyte. In a conventional lead-acid battery, the cathode or positive plates typically include lead peroxide ($PbO_2$) as its active material. The anode or negative plates typically include lead (Pb), and the electrolyte typically includes an aqueous solution of sulfuric acid ($H_2SO_4$). The electrodes are connected by an external circuit such that electrons can be transferred therebetween, and thereby create an electrical current.

As electrical current is desired from the battery, energy is released from the battery's stored chemical energy. During this discharge phase the following reactions occur at the anode and cathode, providing a current from the positive to the negative electrode.

Cathode $PbO_2 + 4\ H^+ + SO_4^{2-} + 2e^- \rightarrow PbSO_4 + 2\ H_2O$
Anode $Pb + SO_4^{2-} - 2e^{31} \rightarrow PbSO_4$
Overall $PbO_2 + Pb + 2\ H_2SO_4 \rightarrow 2\ PbSO_4 + 2\ H_2O$ As electrical current is stored in the battery, potential chemical energy is created in the battery. During this charging phase the following reactions occur at the anode and the cathode, providing a current from the negative to the positive electrode.

Cathode $4\ H_2O - 4e^- \rightarrow O_2 + 4\ H^+$
Anode $4\ H + +4e^- \rightarrow 2\ H_2$
Overall $2\ H_2O \rightarrow 2\ H_2 + O_2$ A battery typically will lose some water vapor due to its conversion process and the heat generated by the charging and discharging process. As this water leaves it will take a certain amount of sulfuric acid with it because of the aqueous solution environment. Sulfuric acid in aqueous form is highly corrosive. It can cause premature corrosion of any metal surface that it contacts.

Others have solved this problem in the past by providing drain tubes that direct the aqueous solution to a desired location as is described in U.S. Pat. No. 4,098,366, titled "Device for Mounting A Storage Battery" issued Jul. 4, 1978. Although this apparatus may work satisfactorily in reducing corrosion on neighboring components, there continues to be a need for other inventive apparati that control the aqueous sulfuric acid discharged from a battery.

SUMMARY OF THE INVENTION

Accordingly, it is a principal objective of the present invention to provide a battery tray for holding a battery and controlling the battery discharge in a truly unique fashion.

It is another objective of the present invention to provide a battery tray that includes a fluid retention cup and a drainage system to protect a thermocouple.

It is a further objective of the present invention to provide a battery tray that includes a fluid retention cup having a vent or slot to allow the water component of an aqueous solution to evaporate over time.

In one form, the present invention provides a battery tray that includes a system for controlling the flow of fluid. The battery tray includes a base surface-having a retention cup formed therein. The retention cup collects aqueous sulfuric acid discharged from the battery. The retention cup includes a vent or slot formed therein to allow its contents to evaporate over time. A system of troughs and channels are included in the base surface to direct fluid flow towards the retention cup. The present invention effectively controls the flow of aqueous sulfuric acid so that the acid does not contact neighboring vehicular components that may corrode while in contact with aqueous sulfuric acid.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
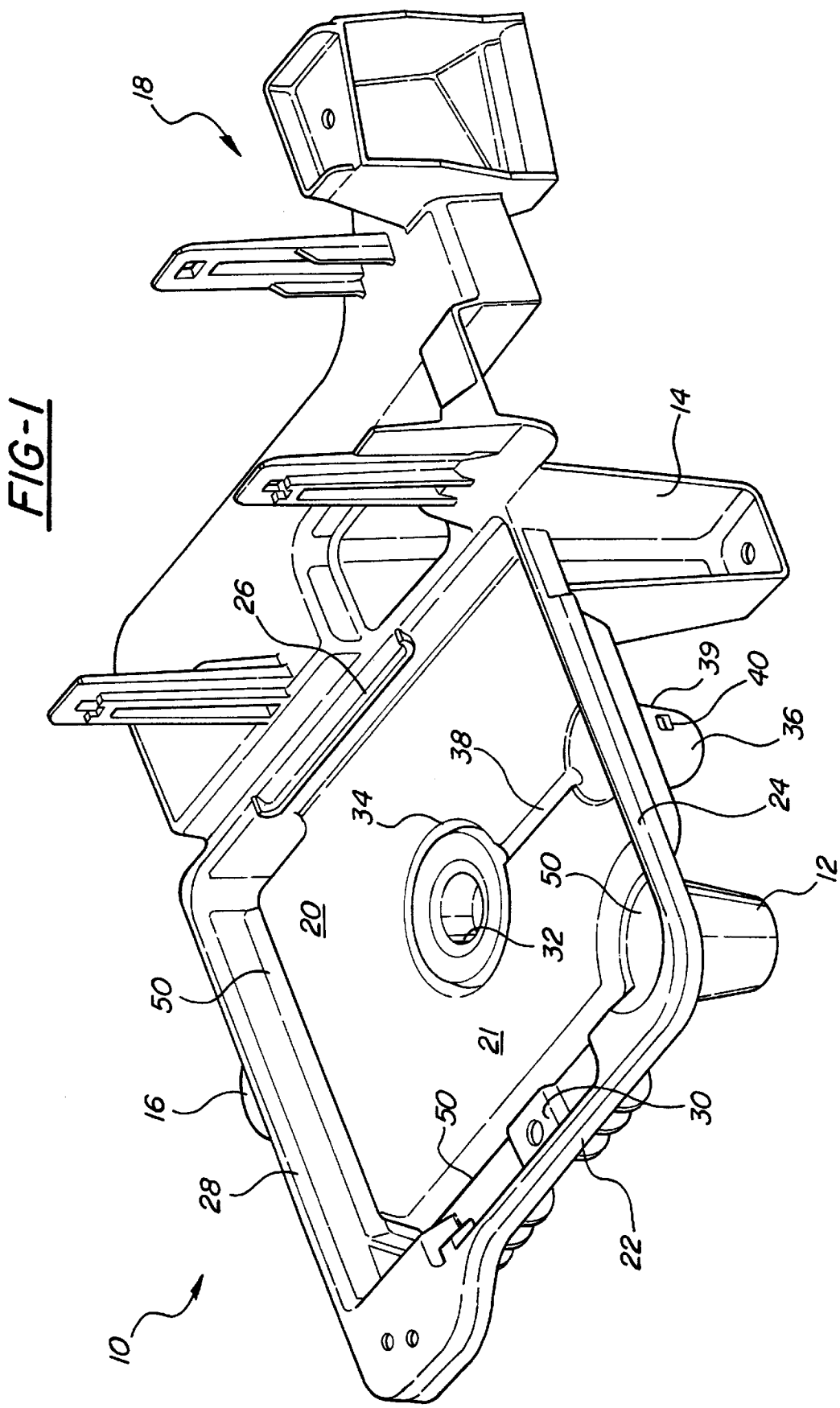
FIG. 1 is a perspective view of the battery tray of the present invention.

Referring now to the drawings, there is depicted a battery tray illustrating the preferred embodiment of the present invention. Turning first to FIG. 1, a battery tray 10 is shown. Tray 10 includes a front mounting leg 12 that is adapted to contact a vehicle (not shown). Tray 10 also includes a mounting bracket 14 and a mounting flange 16 to support tray 10 on the vehicle. Tray also includes various other features 18 to attach other parts of the vehicle.

Tray 10 includes a battery reception portion 20. A battery (not shown), typically an automotive lead-acid battery, can be placed into portion 20. Portion 20 is bounded vertically by base surface 21. Portion 20 is bounded horizontally by four side-wall structures 22, 24, 26, and 28 that extend upwardly from base surface 21. Side-wall structures 22, 24, 26, and 28 are minimal in height compared to the battery. Side-wall structure 22 includes a formation 30 to accept a bracket (not shown) that helps to maintain the battery in proper position.

Figure 2:
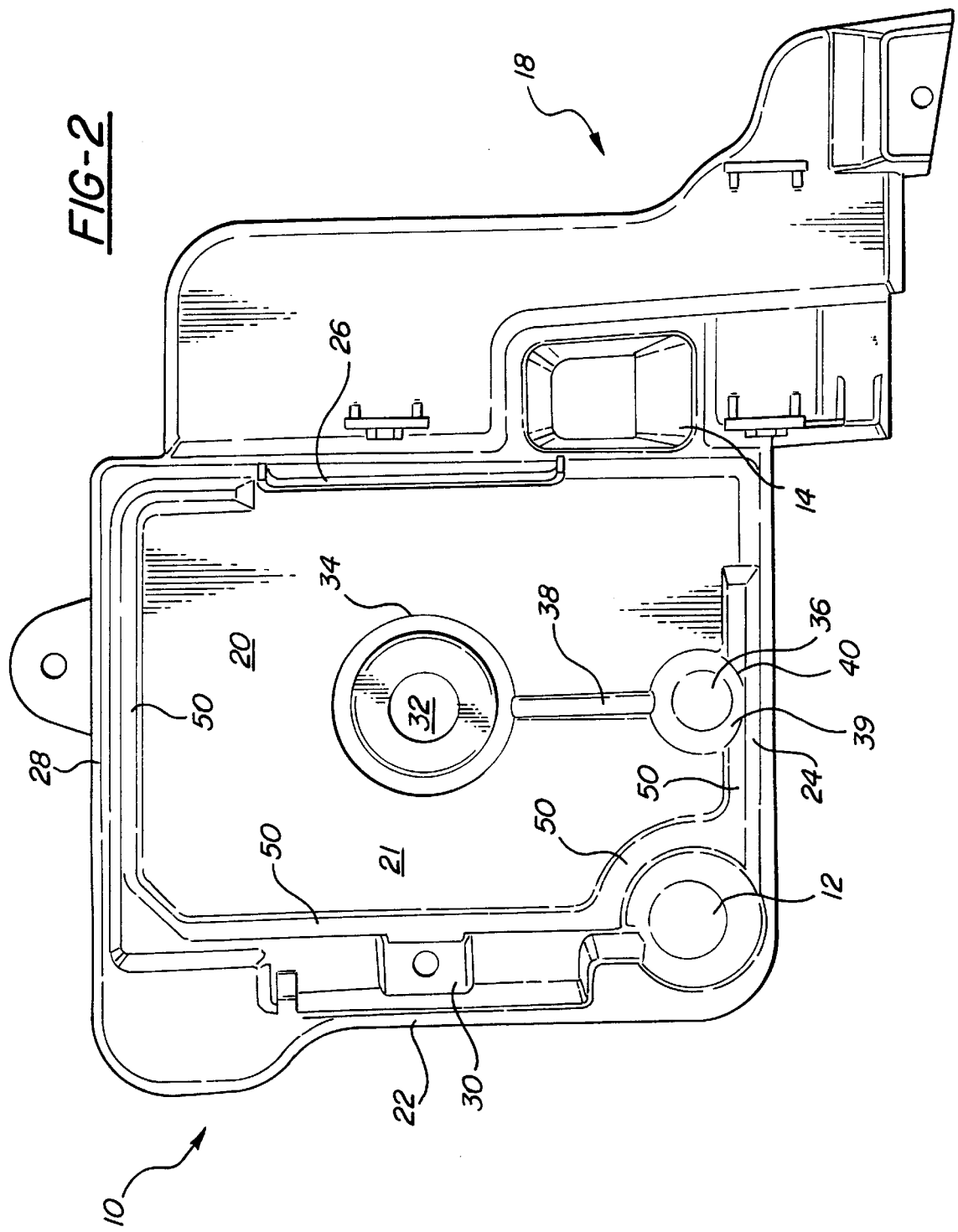
FIG. 2 is a top view of the battery tray of the present invention.

Base surface 21 includes an opening 32 formed therein for reception of a thermocouple (not shown). The thermocouple is adopted to monitor the temperature of the battery. Disposed around opening 32 is a circular indentation or trough 34. A retention cup 36 is also provided by base surface 21. Retention cup 36 and through 34 are interconnected by a channel 38. Base surface 21 also includes an outer channel 50 that is also connected to retention cup 36. Channel 50, best illustrated in FIG. 2, is disposed adjacent to side-walls 22, 24, and 28. The base surface 21 is slightly pitched so as to direct fluid flow into either trough 34, channel 38, outer channel 50, or retention cup 36. There is also a slight pitch within trough 34, outer channel 50, and channel 38 to direct fluid flow to the retention cup 36. Aqueous sulfuric acid is discharged from the battery at various times. This fluid direction system is intended to retard aqueous sulfuric acid from contacting the thermocouple as well as other neighboring metal components. The battery tray 10 is constructed from glass filled polypropylene that will not corrode like metal components while in contact with aqueous sulfuric acid.

The retention cup 36 includes a slot or vent 40 formed on a vertical cylindrical wall 39 thereof. As aqueous sulfuric acid is collected into cup 36, it slowly evaporates through slot 40. The composition of the evaporating liquid is primarily water, therefore, the majority of the sulfuric acid will remain in the retention cup. Ultimately the sulfuric acid will become solid as the water is completely evaporated off. Sulfuric acid in the solid form does not possess the same corrosive qualities as aqueous sulfuric acid. During the life of a battery, only small amounts of acid are released, therefore a cup 36 capable of holding only a few ounces of liquid is necessary in the present invention.

While the above description constitutes the preferred embodiment of the invention, it will be appreciated that the invention is susceptible to modification, variation, and change without departing from the proper scope or fair meaning of the accompanying claims.

What is claimed is:

1. A battery tray adapted to receive a battery, said battery tray comprising:

a base surface having a retention cup formed therein, said retention cup adapted for collecting an aqueous acid having an acid component and a water component that is discharged from the battery;

wherein said retention cup includes a slot formed therethrough to allow the water component of the aqueous acid to evaporate over time.

2. The invention as set forth in claim 1, wherein said base structure also includes an opening for reception of a thermocouple.

3. The invention as set forth in claim 2, wherein said base structure includes a circular through disposed about said opening.

4. The invention as set forth in claim 3, wherein said base structure includes a channel interconnecting said circular through and said retention cup.

5. The invention as set forth in claims 4, wherein said base structure includes a side-wall extending upward therefrom.

6. The invention as set forth in claims wherein said base structure includes an outer channel disposed adjacent to said side-wall and connected to said retention cup.

7. The invention as set forth in claim 6, wherein said base structure is comprised of glass filled polypropylene.

8. A system for controlling fluid flow around a battery in a motor vehicle, the invention comprising a base surface having a retention cup formed therein, said retention cup having a slot formed therein, said base surface including an opening for reception of a-thermocouple and a circular trough formed about said opening, said base surface also includes a channel interconnecting said circular trough and said retention cup, said base structure also includes a plurality of side-walls extending perpendicularly therefrom, said base structure also includes an outer channel disposed adjacent to at least two of said side-walls and connected to said retention cup, wherein said base surface is adapted to receive a battery.

* * * * *